United States Patent
Fischer et al.

(10) Patent No.: US 7,043,009 B1
(45) Date of Patent: May 9, 2006

(54) PROVIDING CUSTOMER DATA TO AN AUTOMATIC CALL DISTRIBUTION SYSTEM AGENT

(75) Inventors: Paul Fischer, Downes Grove, IL (US); Darryl Hymel, Batavia, IL (US); Bernard McGourty, Westmont, IL (US)

(73) Assignee: Rockwell Electronic Commerce Technologies LLC, Lombard, IL (US)

( * ) Notice: Subject to any disclaimer, the term of this patent is extended or adjusted under 35 U.S.C. 154(b) by 0 days.

(21) Appl. No.: 09/499,817

(22) Filed: Feb. 8, 2000

(51) Int. Cl.
*H04M 3/00* (2006.01)
(52) U.S. Cl. .............................. 379/265.09; 379/88.17; 379/265.02
(58) Field of Classification Search .............. 379/88.17, 379/93.12, 93.17, 93.23, 265.09, 900, 265.02; 709/203
See application file for complete search history.

(56) References Cited

U.S. PATENT DOCUMENTS

| 5,140,611 | A | | 8/1992 | Jones et al. ..................... 375/7 |
| 5,268,903 | A | | 12/1993 | Jones et al. ............... 370/110.1 |
| 5,335,269 | A | | 8/1994 | Steinlicht ..................... 379/266 |
| 5,365,581 | A | | 11/1994 | Baker et al. ................ 379/196 |
| 5,400,327 | A | | 3/1995 | Dezonno ..................... 370/62 |
| 5,963,913 | A | * | 10/1999 | Henneuse et al. ............. 705/9 |
| 6,141,413 | A | * | 10/2000 | Waldner et al. .......... 379/88.17 |
| 6,311,231 | B1 | * | 10/2001 | Bateman et al. ....... 379/265.09 |
| 6,438,599 | B1 | * | 8/2002 | Chack ........................ 709/229 |
| 6,493,447 | B1 | * | 12/2002 | Goss et al. ............ 379/265.09 |

* cited by examiner

*Primary Examiner*—Bing Q. Bui
(74) *Attorney, Agent, or Firm*—Welsh & Katz, Ltd.

(57) ABSTRACT

Method and apparatus for providing customer data to an agent in connection with an organization's automatic call distribution (ACD) system. The desired customer data and its format can be tailored to the organization's needs and packaged as a web page. The ACD provides a URL to a browser of the agent, which accesses the URL at a server. The web page corresponds with the URL and is provided by the server to the browser. The data can be displayed to the agent, regardless of the type of customer contact with the organization's ACD system.

25 Claims, 2 Drawing Sheets

PROVIDING CUSTOMER DATA TO AN AUTOMATIC CALL DISTRIBUTION SYSTEM AGENT

BACKGROUND AND SUMMARY

The present invention relates to providing customer data in an automatic call distribution (ACD) system.

ACD systems are typically used to distribute telephone calls among a group of agents of an organization. ACD systems may be used to distribute calls under any of a number of different formats. In a first instance, the term "call" may be used to refer to a request for communication received from (or placed through) a public switched telephone network (PSTN). A call may also be a voice path based upon packet data transferred through a computer network such as the Internet using web telephony. Alternatively, a call may be any communication such as an e-mail, a facsimile, video, web-site inquiry received through the Internet, etc. Thus, ACD systems are transaction processing systems which typically handle one or more of a wide variety of these "call" types.

An organization often disseminates a single telephone number, URL or e-mail address to customers and to the public in general as a means of contacting the organization. As calls are directed to the organization from the PSTN or the Internet, the ACD system directs the calls to the organization's agents based upon some algorithm. For example, where all agents are considered equal, the ACD may distribute a call based on which agent has been idle the longest time. Of course, there are many other possible ways to select an agent, or a subgroup of agents from whom an available one will be selected.

The ACD system can be provided with any number of routing mechanisms for establishing call paths between callers and agents. In some systems, a first path may be established through a circuit switched voice port, such as for calls from the PSTN. An alternative path may be a data link (such as over a Local Area Network (LAN)) such as for an e-mail received through a computer network such as the Internet. A data link also can be used to provide customer data to the agent. For example, such customer data can include contact information relating to the particular contact, such as a customer identifier provided by the customer in response to automatic inquiries. As another example, such data also can include previously stored information available from a database of the organization.

Control of the switching and communications with a database and with an external network such as a PSTN may, for example, be accomplished generally as described in U.S. Pat. Nos. 5,268,903 and 5,140,611, both to Jones et al. which are hereby incorporated by reference. Routing of calls to agents may, for example, be accomplished generally as described in U.S. Pat. No. 5,335,269 to Steinlicht, U.S. Pat. No. 5,365,581 to Baker et al., and U.S. Pat. No. 5,400,327 to Dezonno, which are hereby incorporated by reference.

In existing systems, providing an agent with customer data, such as mentioned above, can require specialized application programs for agent computer terminals. In some instances, it can require disclosure of proprietary information to interface an ACD with network computers. In some cases, it can limit an organization to types of data and to a format built into purchased ACD systems.

In one embodiment of the present invention, use is made of browser application programs which now are readily available independent of an ACD system, and which are already commonly installed on many personal computers. Desired customer data and its format can be tailored to the organization's needs, and can be packaged as a web page. The ACD can provide a universal resource locator (URL) to a browser of the agent, which accesses the URL address at a server. The web page corresponding with the URL is provided by the server to the browser. The data can be displayed to the agent, regardless of the type of customer contact with the organization's ACD system.

The features of the present invention which are believed to be novel are set forth below with particularity in the appended claims. The invention, together with further advantages thereof, may be understood by reference to the following description in conjunction with the accompanying figures, which illustrate some embodiments of the invention.

DETAILED DESCRIPTION

Figure 1:
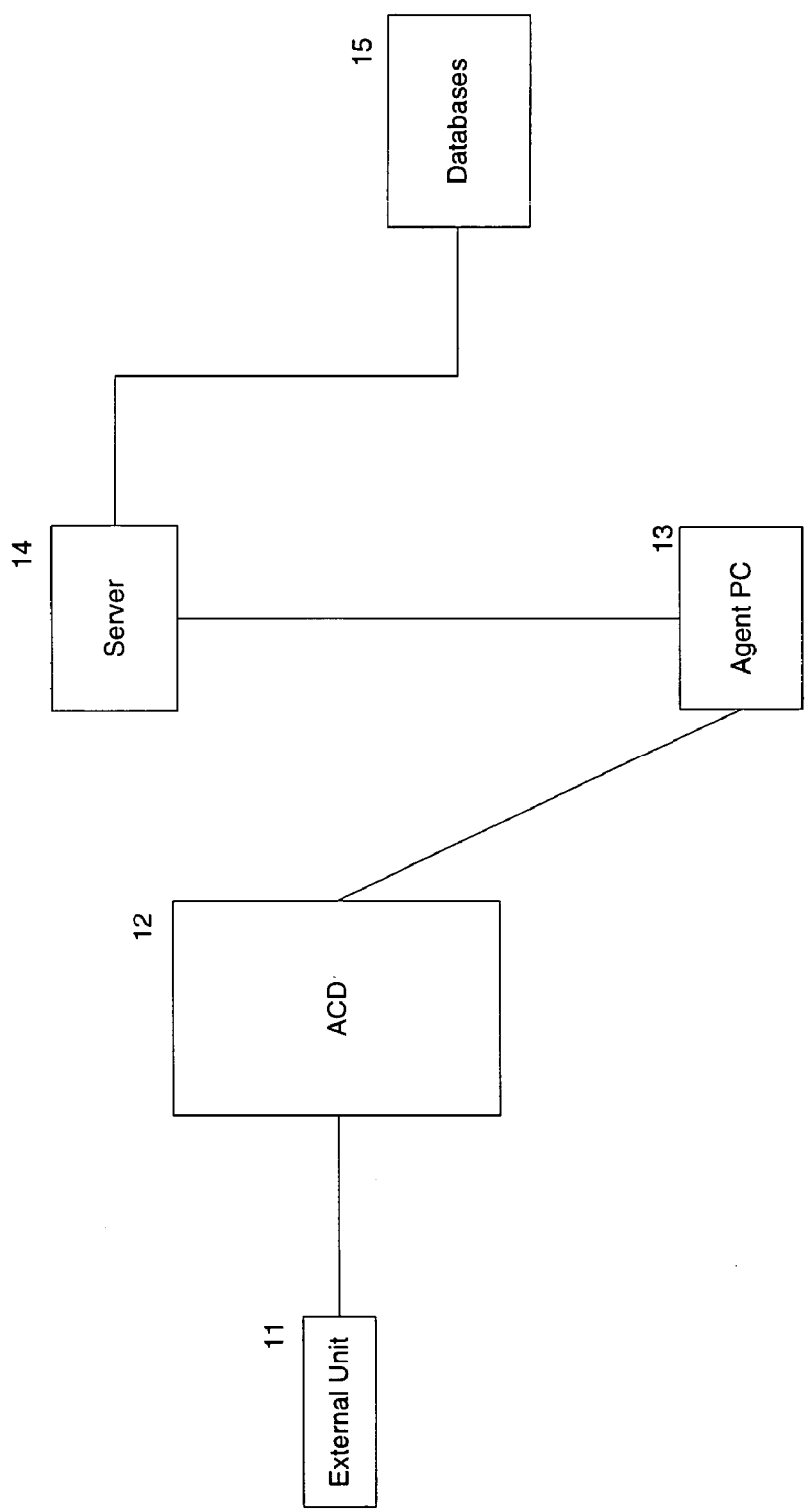
FIG. 1 is a functional block diagram illustrating an embodiment of the invention.

FIG. 1 is a functional block diagram illustrating an embodiment of the invention. The contact between an external unit 11 and an organization's ACD 12 can be in any one or any combination of ways, such as through a public switched telephone network (PSTN), an internet network, a local area network, or other voice and/or data network. This contact can, for example, be a traditional inbound telephone call. Some other examples of types of contacts include web callbacks, e-mail contacts, and web chat contacts.

Upon receiving a contact from an external unit 11, the ACD 12 will process the contact by routing it to an agent. The agent can be one of a plurality of agents at a plurality of agent stations. Communication between ACD 12 and an agent can be any suitable communication link including, for example, a data link and/or a circuit switched telephone connection. It could be through a private network and/or a public network (particularly for a remote agent). It could include hardwire and/or wireless communications.

In the embodiment of FIG. 1, the agent station comprises an agent personal computer 13 with a browser application program. A browser is software which translates the digital bits in a computer location to a medium which can be displayed meaningfully to the user such as written text. A web browser is an interface which allows display at a personal computer monitor of data located in a computer network. Web browsers are readily available and are commonly installed in personal computers today.

In the embodiment of FIG. 1, the browser in the agent's personal computer 13 can access a server 14. Server 14 has access to one or more databases 15. In one configuration, the server 14 can be publicly accessible such as through the Internet and it also can, for example, be part of an intranet, or private computer network which uses Internet software and standards. It is common today for an organization to set up an intranet, in which access to at least certain data is limited to the organization or to parts of the organization.

Figure 2:
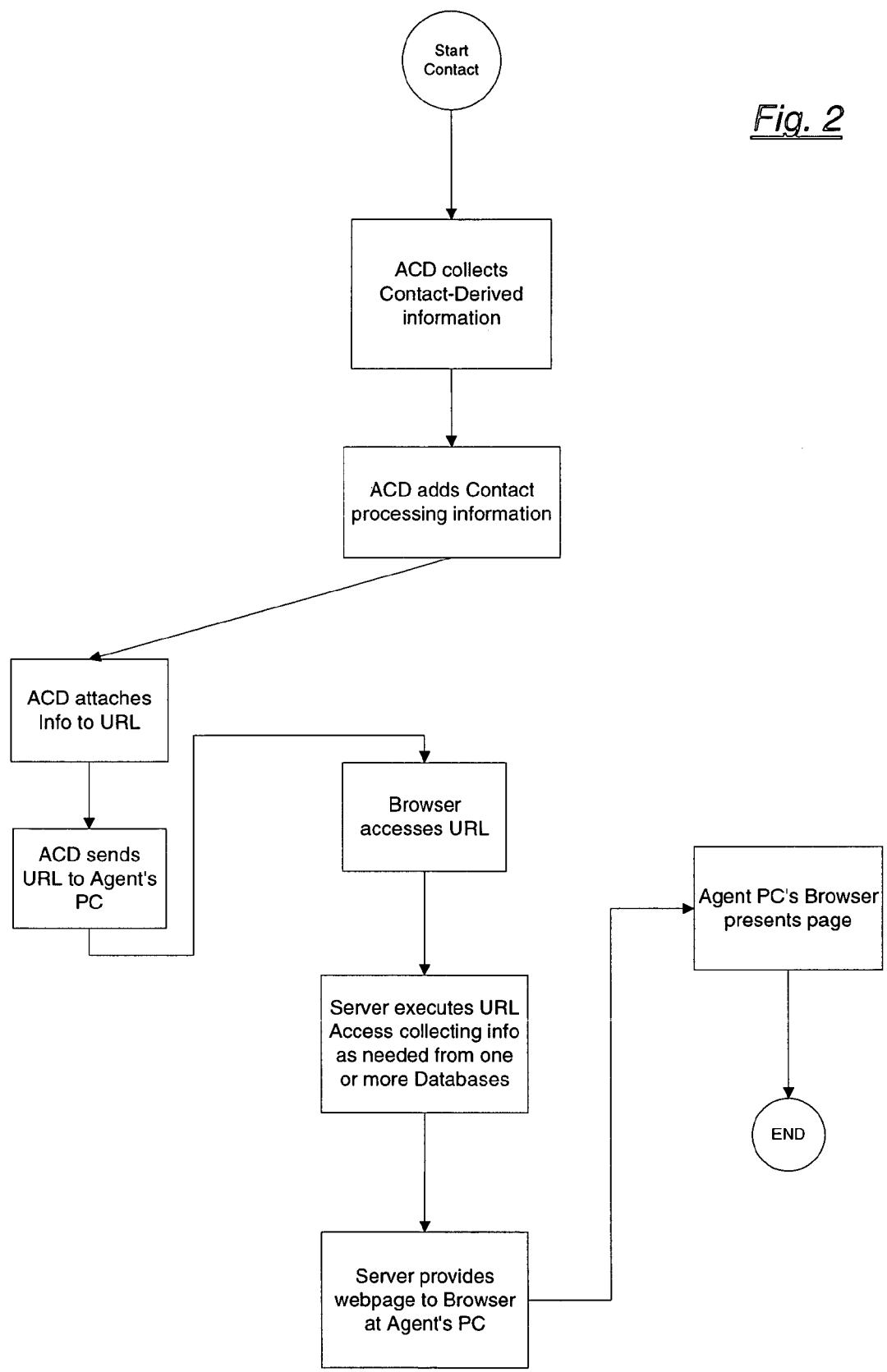
FIG. 2 is a flow chart illustrating the an embodiment of the invention.

The objective of providing data, relating to a particular contact, to the agent handling the contact can be accomplished using any over-the-counter browser on the agent's personal computer 13 without the need for specialized software. FIG. 2 is a flow chart illustrating an example of how this can be accomplished, regardless of the contact type.

As shown in FIG. 2, ACD 12 can collect contact-derived information before a contact is routed to an agent. For example, in the case of a traditional telephone call, contact-derived information such as a calling party number, a called party number, or an account number can be collected by the ACD 12. For purposes of discussion, calling party number is used to refer generally to information about the call originator which might be derived from the call being made. For example, ANI or automatic number identification can provide the billing number of the originating party. Caller ID can provide a telephone number and name of the originating telephone subscriber in many instances. This information can be collected by ACD 12 as soon as the telephone call arrives.

A called party number can be provided by DNIS or dialed number identification service. An organization can use one trunk group to serve a plurality of telephone numbers. Each number can be associated with a separate function, such as sales inquiries, customer technical service, account maintenance, internal use, and so forth. Consequently, the called party number can provide information about the purpose of the telephone call.

An account number, a product model number (such as for technical service assistance), or other information can be collected from the caller, such as by a VRU or voice response unit, through programmed scripts prior to the ACD 12 routing the call to an agent.

Similar contact-derived information can be collected by the ACD 12 regardless of the type of contact. For example, the source name and subject line of an incoming e-mail can be collected automatically by the ACD 12. In the case of a web callback contact, the ACD could at a minimum collect the number it is calling back and the name of the person for whom the agent is supposed to ask when the callback is executed. A contact's computer address could be collected with a web callback or with a web chat contact.

As shown in FIG. 2, ACD 12 also can add contact processing information, such as the type of contact, identification of the agent to whom the contact is being routed, or identification of the treatment given the contact (such as the programmed scripts used) which can affect the information which should be displayed to the agent.

Continuing with FIG. 2, ACD 12 can attach the contact-derived information and/or the contact processing information mentioned above to a URL, or universal resource locator, which the ACD can send to the agent's personal computer 13. A URL is a string expression that at least constitutes a computer network address. Conventionally, a URL begins with a protocol method which a browser is to use when searching for the address. The most common protocol is http (hypertext transport protocol). The information which the ACD 12 can attach to the URL can be information which will be at least part of the data ultimately displayed to the agent. It also can be information used to identify other data which will be sought and packaged for display. For example, an account number collected by the ACD 12 can be used to identify the account information which can then be collected from a database 15 for display at the agent's personal computer 13.

In one embodiment, ACD 12 can send the URL to the browser on the agent's personal computer 13, without the need for any software relating to the ACD 12 on the agent's personal computer. In another embodiment, ACD 12 can send the URL to separate ACD console software on the agent's personal computer 13, and that separate software can provide the URL to the browser.

An organization can develop the type of information and format for information required by its agents. This can include information stored in a plurality of unrelated databases 15, including private information about particular customers stored in limited access locations. The format for this information, and/or instructions for obtaining at least some of the information, can be located on server 14. An organization can develop and set up what it desires on server 14, independent of hardware and software constituting the organization's ACD system 12.

As mentioned above, the browser can be an ordinary over-the-counter software program, independent of the ACD system 12. Continuing with FIG. 2, the browser can operate on the URL received from the ACD 12 just like the browser normally operates. The computer network address included in the URL from ACD 12 can be located in server 14. One or more web pages corresponding with the URL can be displayed to the agent via the browser in the agent's personal computer 13. The web page can be an HTML page. HTML, or hypertext markup language, is a software language frequently used to create web pages. The web page can be a static page. The web page can include links for additional information. An organization can use more than one URL in connection with its ACD system 12. The particular URL, and the particular data in the corresponding web page, can depend on some of the contact information discussed above.

Server 14 can include instructions or programs necessary to set up the web page corresponding with the URL, to obtain the content or values of specified parameters, and to interface with any databases 15 to obtain required data. The URL to be sent by the ACD 12 can be configurable to correspond with what has been programmed in the server 14. However, the ACD 12 need only send the URL to the agent's personal computer 13. The ACD 12 need not constrain what is to be displayed to the agent, and need not be integrated with any interfaces necessary to obtain the desired data. The plurality of personal computers 13 of the plurality of agents only need ordinary over-the-counter browsers, and do not need other software application programs to interface with one or more databases 15 or to control the display of data.

The embodiments discussed and/or shown in the figures are examples. They are not exclusive ways to practice the present invention, and it should be understood that there is no intent to limit the invention by such disclosure. Rather, it is intended to cover all modifications and alternative constructions and embodiments that fall within the scope of the invention as defined in the following claims:

What is claimed is:

1. A method of providing data relating to a customer contact with an automatic call distribution (ACD) system to an ACD agent, the method comprising:
   providing a universal resource locator (URL) configured by the ACD system to a browser of the agent;
   accessing the URL at a server in response to a request from the browser;
   providing at least one web page to the browser, the web page corresponding with the URL and including the data;
   the data including information about the customer.

2. A method as in claim 1, further comprising accessing via the server at least one database to obtain at least some of the data for inclusion in the web page.

3. A method as in claim 1, further comprising attaching information to the URL before providing the URL to the browser.

4. A method as in claim 3, the information attached to the URL including contact processing information, said contact processing information including at least one of a group consisting of: type of the customer contact, identification of the agent, and treatment of the contact by the ACD.

5. A method as in claim 3, the information attached to the URL including contact-derived information, said contact-derived information including at least one of a group consisting of: a calling party number, a billing number associated with an origin of the customer contact, a telephone number associated with the origin of the customer contact, a subscriber name associated with the origin of the customer contact, a called party number, information provided in response to a programmed script, identification of a customer provided in response to a programmed script, an account number provided in response to a programmed script, a product model number provided in response to a programmed script, an e-mail source name, an e-mail subject line, a callback number provided in a web callback contact, a callback name provided in a web callback contact, and a computer address associated with the origin of the customer contact.

6. A method as in claim 1, wherein the data in the web page includes at least some information attached to the URL by the ACD.

7. A method as in claim 1, further comprising selecting the URL based on information about the contact available to the ACD.

8. A method as in claim 1, further comprising obtaining at least some of the data in the web page based on at least some information attached to the URL by the ACD.

9. A method as in claim 1, wherein the step of providing the URL comprises:
sending the URL to ACD console software of the agent; and
providing the URL to the browser from the console software.

10. A method as in claim 1, wherein the step of providing the URL comprises sending the URL directly to the browser from the ACD system.

11. A method as in claim 1, the server being accessible through at least one of a group consisting of: a publicly accessible computer network, limited-access computer network, and a private computer network accessible within an organization operating the ACD.

12. A method as in claim 1, the customer contact being one of a group consisting of: a telephone call, an e-mail contact, a web callback contact, a web chat contact, a facsimile contact, a video contact, and a web telephony voice contact.

13. A method as in claim 1, further comprising displaying the web page to the agent.

14. A computer system for providing data, relating to a customer contact with an automatic call distribution (ACD) system, to an ACD agent, the computer system comprising:
the ACD system capable of configuring a universal resource locator (URL);
a server capable of providing at least one web page to a browser, the web page corresponding with the URL and including the data;
the data including information about the customer;
at least one agent station coupled with the ACD system and having a browser capable of accessing the URL at the server.

15. A computer system as in claim 14, further comprising at least one database, accessible by the server for obtaining at least some of the data for inclusion in the web page.

16. A computer system as in claim 14, the ACD being capable of attaching information to the URL.

17. A computer system as in claim 14, the ACD being capable of collecting contact-derived information, said contact-derived information including at least one of a group consisting of: a calling party number, a billing number associated with an origin of the customer contact, a telephone number associated with the origin of the customer contact, a subscriber name associated with the origin of the customer contact, a called party number, information provided in response to a programmed script, identification of a customer provided in response to a programmed script, an account number provided in response to a programmed script, a product model number provided in response to a programmed script, an e-mail source name, an e-mail subject line, a callback number provided in a web callback contact, a callback name provided in a web callback contact, and a computer address associated with the origin of the customer contact.

18. A computer system as in claim 14, the server being capable of obtaining at least some of the data in the web page based on at least some information attached to the URL by the ACD.

19. A computer system as in claim 14, the customer contact being one of a group consisting of: a telephone call, an e-mail contact, a web callback contact, a web chat contact, a facsimile contact, a video contact, and a web telephony voice contact.

20. A computer system of providing data, relating to a customer contact with an automatic call distribution (ACD) system, to an ACD agent, the computer system comprising:
a server accessible through a computer network;
at least one agent station having means for accessing a universal resource locator (URL) at the server;
means for the ACD system to configure the URL;
means for providing at least one web page to the agent station from the server, the web page corresponding with the URL and including the data;
the data including information about the customer.

21. A computer system as in claim 20, further comprising at least one database; and
means for accessing the database to obtain at least some of the data for inclusion in the web page.

22. A computer system as in claim 20, further comprising means for the ACD to attach information to the URL.

23. A computer system as in claim 20, further comprising means for the ACD to collect contact-derived information.

24. A computer system as in claim 20, further comprising means for displaying the web page to the agent.

25. A method of providing data, relating to a customer contact with an automatic call distribution (ACD) system, to an ACD agent, the method comprising:
providing a universal resource locator (URL) from the ACD system to a browser of the agent;
configuring the URL based on information about the contact available to the ACD;
attaching information to the URL before providing the URL to the browser;
the information attached to the URL including contact processing information, said contact processing information including at least one of a group consisting of: type of the customer contact, identification of the agent, and treatment of the contact by the ACD;
the information attached to the URL including contact-derived information, said contact-derived information including at least one of a group consisting of: a calling party number, a billing number associated with an origin of the customer contact, a telephone number associated with the origin of the customer contact, a subscriber name associated with the origin of the customer contact, a called party number, information provided in response to a programmed script, identification of a customer provided in response to a programmed script, an account number provided in response to a programmed script, a product model number provided in response to a programmed script, an e-mail source name, an e-mail subject line, a callback number provided in a web callback contact, a callback name provided in a web callback contact, and a computer address associated with the origin of the customer contact;

accessing the URL at a server in response to a request from the browser;

providing at least one web page to the browser, the web page corresponding with the URL and including the data relating to the customer contact;

accessing via the server at least one database to obtain at least some of the data for inclusion in the web page;

obtaining at least some of the data in the web page based on at least some information attached to the URL by the ACD;

including among the data in the web page at least some information attached to the URL by the ACD; and displaying the web page to the agent.

* * * * *